United States Patent [19]
Gaus, Jr.

[11] Patent Number: 5,550,505
[45] Date of Patent: Aug. 27, 1996

[54] FREQUENCY SHIFT KEYING (FSK) DEMODULATOR FOR USE IN LOW SIGNAL-TO-NOISE RATIO ENVIRONMENTS

[75] Inventor: Richard C. Gaus, Jr., Burnt Hills, N.Y.

[73] Assignee: General Electric Company, Schenectady, N.Y.

[21] Appl. No.: 366,932

[22] Filed: Dec. 30, 1994

[51] Int. Cl.$^6$ .................................................. H03D 3/04
[52] U.S. Cl. ........................... 329/300; 329/303; 329/341
[58] Field of Search ................................... 329/300, 303, 329/341, 343, 372, 301, 302; 375/334, 335, 336

[56] References Cited

U.S. PATENT DOCUMENTS

| | | | |
|---|---|---|---|
| 4,115,738 | 9/1978 | Mitarai et al. | 329/303 |
| 4,485,347 | 11/1984 | Hirasawa et al. | 329/50 |
| 4,486,715 | 12/1984 | Maas et al. | 329/303 |
| 4,551,846 | 11/1985 | Takeda et al. | 329/303 |

*Primary Examiner*—Robert Pascal
*Assistant Examiner*—David Vu
*Attorney, Agent, or Firm*—Lawrence P. Zale; Marvin Snyder

[57] ABSTRACT

A frequency-shift keying (FSK) demodulator demodulates a binary signal encoded in an FSK signal. The present invention employs a bandpass filter to filter out noise and pass the frequencies used in the modulation. A comparitor converts the received signal into a square wave. A divider reduces the frequency of the square wave signal by a dividing factor. A counter counts the number of square wave transitions in a predetermined time period. A decision device receives the dividing factor from the divider, and uses this factor to adjust the count measured. The adjusted count is compared to counts pertaining to modulated frequencies to select a frequency. A bit value associated with the selected frequency is output for the time period being demodulated.

7 Claims, 3 Drawing Sheets

5,550,505

FREQUENCY SHIFT KEYING (FSK) DEMODULATOR FOR USE IN LOW SIGNAL-TO-NOISE RATIO ENVIRONMENTS

BACKGROUND OF THE INVENTION

1. Field of the Invention

The present invention relates to a method of demodulating binary information encoded in an electronic signal.

2. Discussion of Prior Art

Typically it is necessary to transmit binary information over a channel. This channel may be a hard-wired channel or a radio channel. One method of modulating binary information is frequency shift keying (FSK). In frequency shift keying, a one "1" is represented by a first frequency of a carrier signal and a zero "0" is represented by a second frequency of the carrier signal. The transmitted signal has a frequency reflecting the binary information to be transmitted over time.

The demodulation of FSK signals is performed by a balanced frequency discriminator or a matched filter. In a balanced frequency discriminator, the output voltage is a linear function of the input frequency. A balanced frequency discriminator is comprised of a pair of resonant circuits tuned to each of the FSK signaling frequencies. Envelope detectors follow the tuned circuits.

A similar FSK demodulator comprises a pair of filters matched to the signaling waveforms, followed by envelope detectors.

These devices employ analog means of FSK demodulation. Their operation is subject to the inaccuracies and difficulties of maintaining the devices to within the designed tolerances as well as their overall characteristics of having components that are difficult to miniaturize.

Typically, conventional FSK demodulators may not be used in applications which require very low power consumption.

Currently there is a need for an FSK demodulator which is simple, operates well in a low signal-to-noise ratio environment, and has low power requirements.

SUMMARY OF THE INVENTION

A frequency shift keying (FSK) demodulator decodes a binary signal encoded in a received signal.

A comparator in the FSK demodulator processes said received signal into a square wave signal by comparing the received signal to a threshold and creates a 'high' signal when an amplitude of the received signal is above the threshold, and a 'low' signal when the amplitude of the received signal is below the threshold. A counter/timer counts transitions of the square wave from the comparator.

A decision device selects a frequency from a predetermined set of frequencies which most closely corresponds to the measured count, and decodes a bit value corresponding to the selected frequency.

In alternative embodiments of the present invention, a bandpass filter is coupled to the comparator for filtering out all frequencies of the received signal except for a band encompassing the predetermined set of frequencies, before the comparator creates a square wave.

It is also desirable to incorporate a divider between the comparator and counter/timer for dividing the frequency of square wave signal by a dividing factor, providing this signal as the square wave signal to the counter/timer, and for providing the dividing factor to the decision device which employs this value in adjusting the measured count.

An interface device may be employed allowing an operator to select the parameters used in demodulation.

OBJECTS OF THE INVENTION

An object of the present invention is to provide a demodulator which operates well at low signal-to-noise ratios.

Another object of the present invention is to provide a demodulator which may be readily miniaturized.

Another object of the present invention is to provide a demodulator which has low power consumption as compared with conventional demodulators.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

Figure 1:
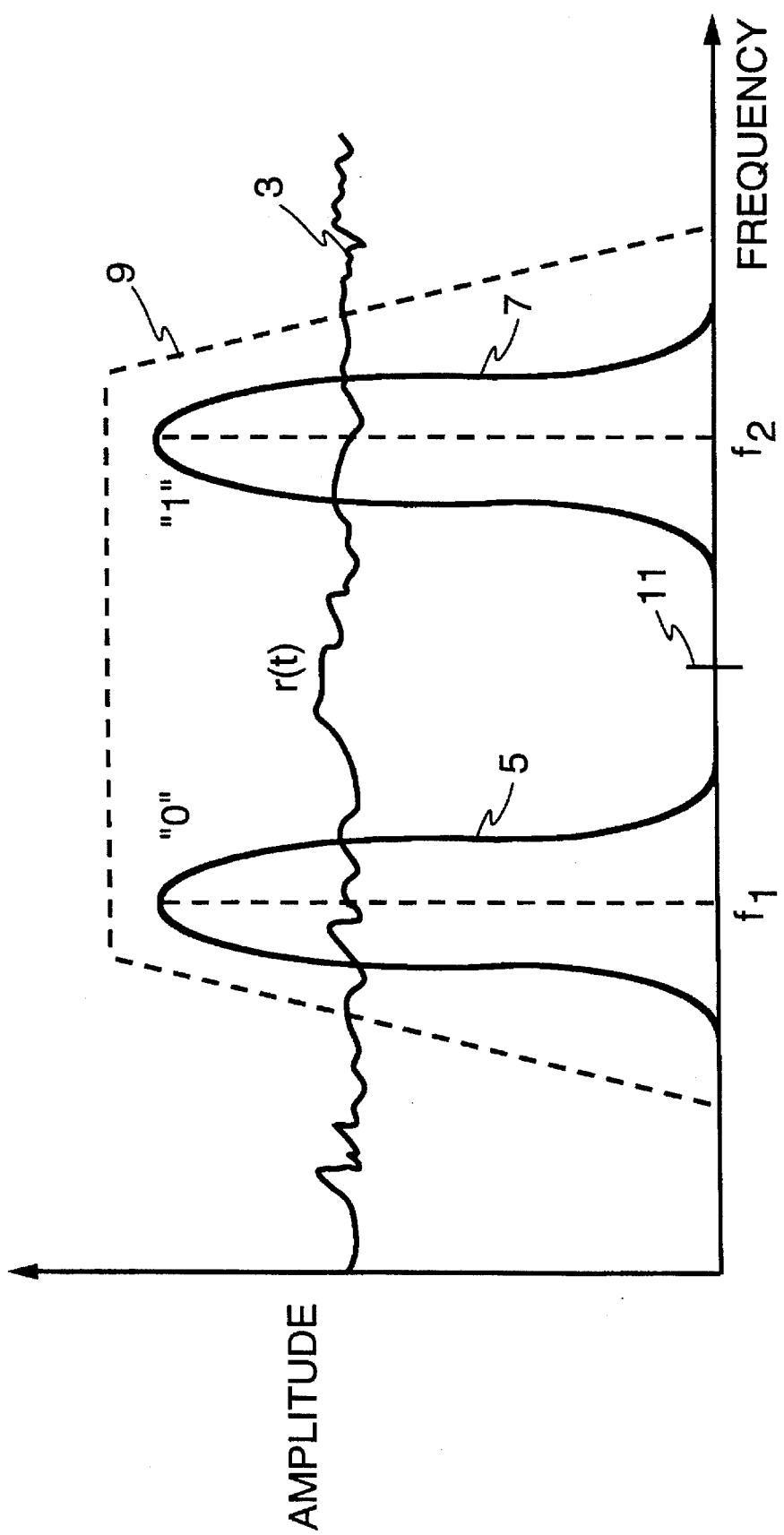
FIG. 1 is a representation, in the frequency domain, of a received frequency-shift keying (FSK) modulated signal used in connection with explaining the present invention.

In FIG. 1 a frequency versus amplitude diagram is shown illustrating frequencies $f_1$ and $f_2$ to be used to encode a zero "0" and a one "1" in a binary encoded frequency shift keying (FSK) modulated signal. A binary source, for example a digital sensor, or a digital representation of a sampled analog sensor, provides a binary stream of information which is intended to be transmitted to a remote receiver. The information is modulated according to the illustration of FIG. 1 with a zero bit of the binary information causing the carrier signal to have a frequency $f_1$, and a one causing the carrier signal to have a frequency $f_2$. The selection of bit values for carrier frequencies is arbitrary, but must be used consistently once selected. The bit values of "1" and "0" could easily be switched with $f_1$ representing a "1" and $f_2$ representing a "0".

The present invention operates very well in a low signal-to-noise ratio environment. One application of the present invention is that of demodulating FSK signals in a gas turbine engine. A significant amount of noise 3 is as shown in FIG. 1. Typical frequencies to be used are $f_1$=1.333 MHz and $f_2$=2.000 MHz.

Figure 2:
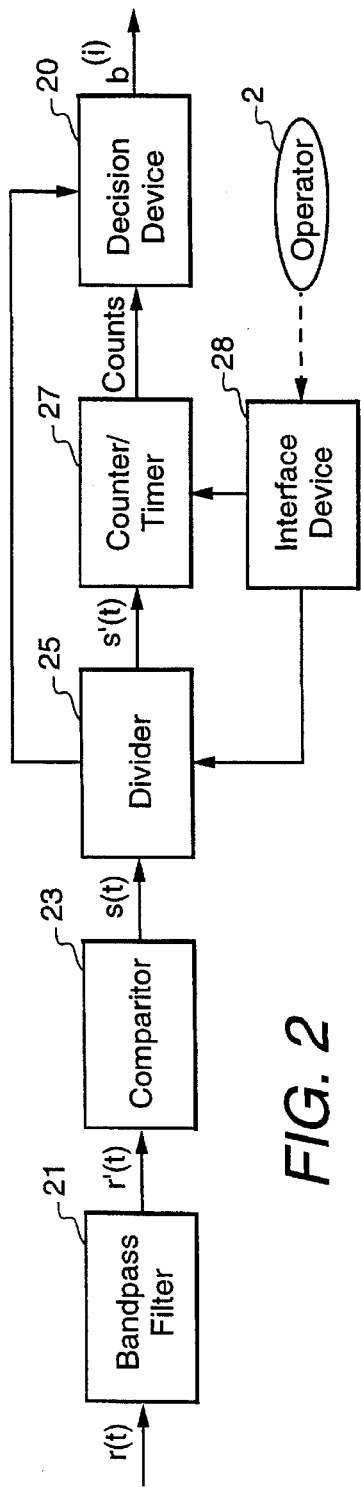
FIG. 2 is a simplified block diagram of an FSK demodulator according to the present invention.

In FIG. 2 a simplified block diagram of the present invention is shown. A time-varying received signal r(t), comprised of an FSK modulated signal having, at an instant in time, either of the peaks 5 or 7, and noise 3 as shown in FIG. 1. Since only a single frequency is sent at a time, either peaks 5 or 7, but not both would be seen in the frequency domain.

Figure 3:
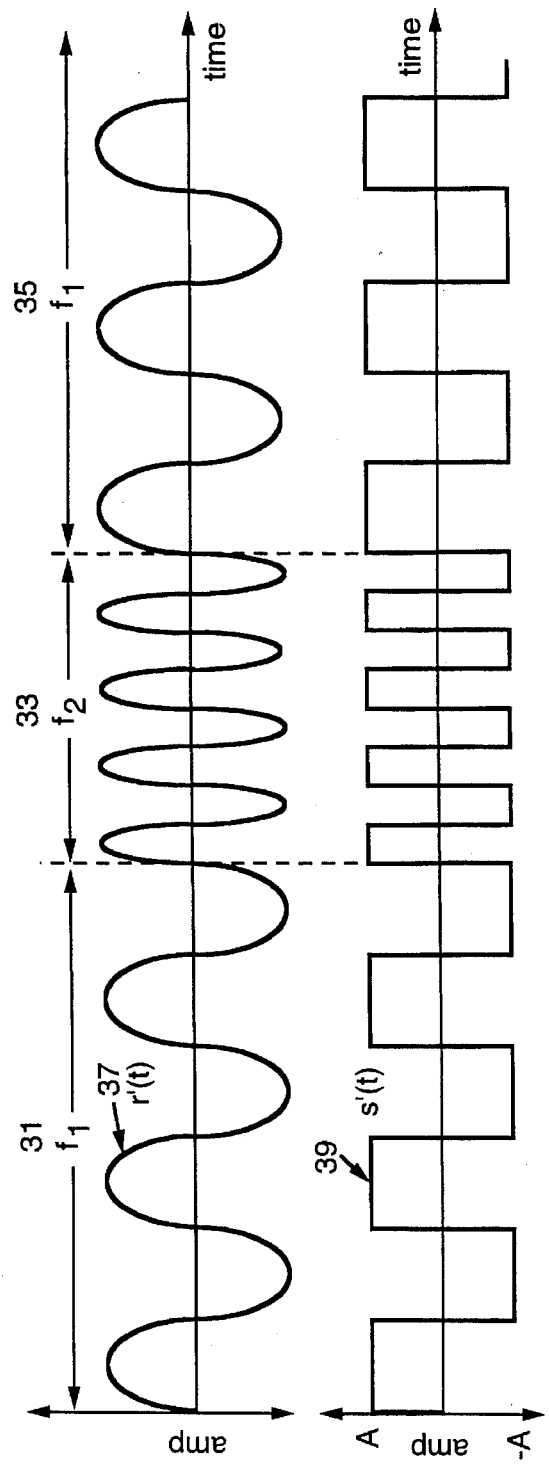
FIG. 3 is time vs. amplitude graph of a filtered received FSK signal and a square wave derived from the FSK signal according to the present invention.

The received signal r(t) then enters a bandpass filter 21 of FIG. 2. Bandpass filter 21 passes the frequency band 9 as shown in FIG. 1, filtering out all other frequencies. Typical bandwidth passed is approximately 800 kHz. The filtered signal r'(t) is then passed to a comparator 23. The filtered signal r'(t), shown as waveform 37 of FIG. 3, is compared to a predetermined threshold value. The threshold value used in this embodiment was zero amplitude, but other values may be used, or alternatively, more than one threshold may be employed. Comparator may be any type of conventional comparator, but is preferably a Schmidt Trigger NAND circuit. Comparator 23 creates a square wave signal s(t), 39 having an amplitude A when the received sinusoidal signal is above the threshold, and −A when the amplitude of the received signal is below the threshold, as shown in FIG. 3.

Figure 4:
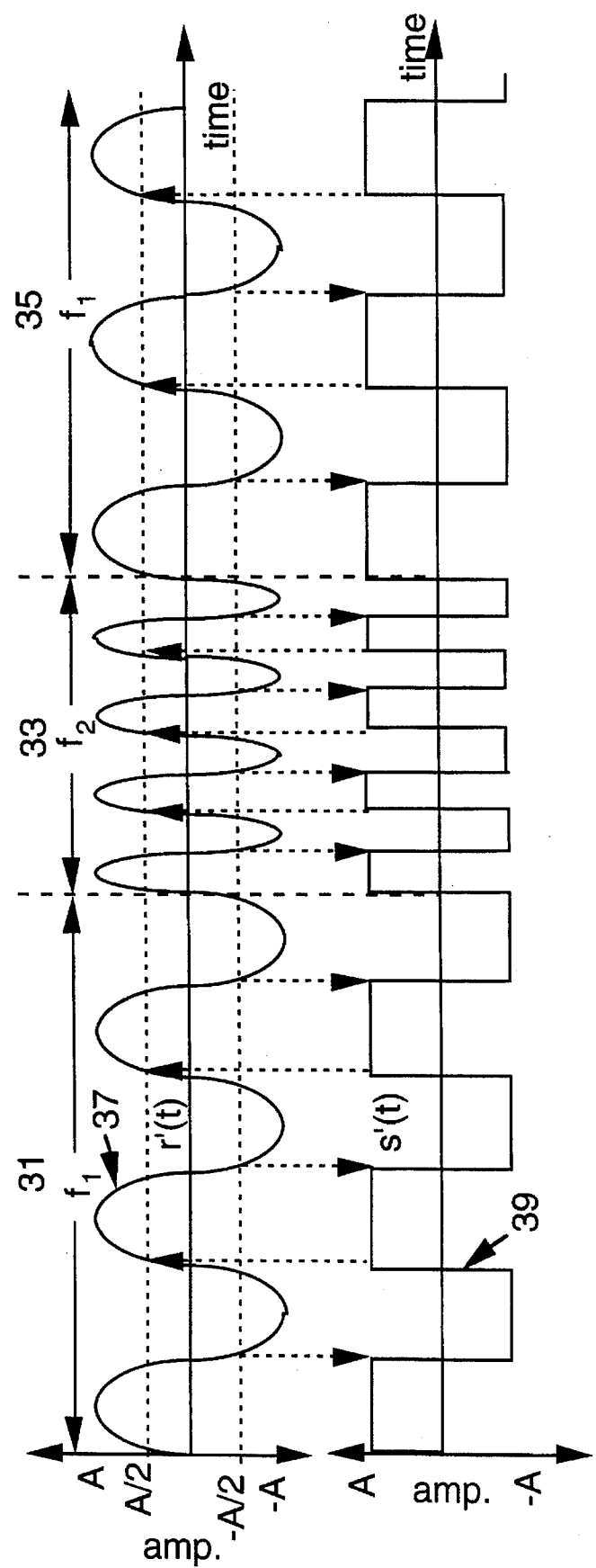
FIG. 4 is a time vs. amplitude graph of a filtered FSK signal and a square wave obtained with a high and low threshold according to the present invention.

FIG. 4 illustrates the same received signal r(t) having a high threshold of A/2 and a low threshold of −A/2 instead of the zero threshold of FIG. 3.

Filtered signal 37 has a frequency $f_1$ in time periods marked 31 and 35. Correspondingly, the square wave 39 created has transitions between amplitudes A and −A at frequency $f_1$ during time periods 31 and 35. During time period 33 both received signal 37 and square wave 39 have a frequency $f_2$.

A programmable divider receives signal s(t) 39 and divides it down to a frequency which is more manageable for digital processing. Typical dividing factors are 64 or 128. The output signal s'(t) of divider 25 corresponds to signal 39 at a lower frequency than s(t) provided to divider 25.

A counter/timer 27 monitors the frequency of state transactions of signal s'(t) in order to determine a count of transitions per time period. Counter/timer 27 may count the number of upward transitions from amplitude −A to amplitude A per time period. It may also count the number of downward transitions from amplitude A to −A. Or counter/timer 27 may count total number of transitions between amplitudes A and −A and divide this count by 2. The number of transitions would be monitored for a specific pre-defined time period and this number of transitions is provided to a decision device 29.

In another embodiment of the present invention, a timer may be used in counter/timer 27 to measure how long it takes to complete a predetermined number of transitions.

Decision device 29 receives the dividing factor from divider 25 used to divide the frequency of signal s(t) down to s'(t). The dividing factor is used with the measured transition counts to determine actual frequencies. Decision device 29 then determines if the measured number of transitions per given time period pertains to a frequency $f_1$ or $f_2$, and produces a bit value appropriate for the associated frequency. One method decision device 29 employs in determining which of the frequencies $f_1$, $f_2$ the count pertains to, is by comparing the measured count to a predetermined count which pertains to frequency equidistant between frequencies $f_1$ and $f_2$ shown as frequency threshold 11 in FIG. 1. Counts above threshold 11 are considered to be $f_2$ being a "1" and counts below threshold 11 are determined to be $f_1$ being a "0".

In an alternative embodiment of the present invention, more than two frequencies $f_1$ and $f_2$ may be used. An example would be four frequencies $f_1$, $f_2$, $f_3$, $f_4$ encoding a 00, 01, 10 and 11, respectively. Frequency thresholds, such as frequency threshold 11, may be used in determining if the counts pertain to the upper two frequencies, $f_3$, $f_4$, or the lower two frequencies, $f_1$, $f_2$. After determining which of the two frequencies the count pertains, an additional comparison against another frequency threshold must be employed to distinguish between either of the upper two frequencies or lower two frequencies.

A more direct comparison method may also employed which the deviation between the measured count and a count pertaining to each of the frequencies. The frequency pertaining to the lowest deviation is used to identify the decoded bits.

To allow programmability to the device, an interface device 28 allows an operator 2 to define parameters used in demodulation. For example, operator 2 may define the dividing factor and provide it to divider 25. Different frequencies may be monitored by having operator 2 provide the frequencies to be monitored, or the corresponding periods/counts per unit time period to decision device 29. The number of different frequencies may also be selected by operator 2 employing interface device 28. This information would also be provided to decision device 29 to allow more than two frequencies to be distinguished. Amplitude thresholds for comparator 23 may also be selected. The predetermined time period over which to count transitions may also be adjusted and provided to counter/timer 27.

Several of the functions of the blocks illustrated in FIG. 2 may be performed by general purpose circuits, such as a microprocessor running an subroutine which performs the functions as described above.

While several presently preferred embodiments of the novel demodulator have been described in detail herein, many modifications and variations will now become apparent to those skilled in the art. It is, therefore, to be understood that the appended claims are intended to cover all such modifications and variations as fall within the true spirit of the invention.

What is claimed is:

1. A frequency shift keying (FSK) demodulator for decoding a binary signal encoded in a received signal comprising:

a) a comparator which processes said received signal into a square wave output signal by comparing the received signal to a high and a low threshold and transitioning an output signal to a 'high' voltage when an amplitude of the received signal is above the high threshold, and a 'low' voltage when the amplitude of the received signal is below the low threshold;

b) a counter/timer for determining a measured count of transitions between high and low voltages of the square wave output signal of the comparator over a predetermined time period;

c) a decision device for selecting a frequency, from a predetermined set of frequencies, which most closely corresponds to the measured count, and for providing at least one bit value corresponding to the selected frequency.

2. The FSK demodulator of claim 1 further comprising a bandpass filter coupled to the comparator for filtering out all frequencies of the received signal except for a band encompassing the predetermined set of frequencies, and providing this signal as the received signal to the comparator.

3. The FSK demodulator of claim 1 further comprising a programmable divider responsive to an input from an operator coupled between the comparator and counter/timer for dividing the frequency of square wave output signal by a dividing factor to result in a reduced signal, providing this reduced signal as the square wave output signal to the counter/timer, and for providing the dividing factor to the decision device which employs this value in adjusting the measured count.

4. The FSK demodulator of claim 3 further comprising an interface device for interacting with an operator to define the dividing factor and for providing this information to the programmable divider.

5. The FSK demodulator of claim 1 further comprising an interface device for interacting with an operator to provide parameters used in demodulation.

6. The FSK demodulator of claim 1 further comprising a interface device for interacting with an operator to define the high and low threshold values, the predetermined time period over which the count is determined, the predetermined set of frequencies, and their corresponding bit values, and for providing this information to the comparator, the counter/timer, and the decision device, appropriately.

7. The frequency shift keying (FSK) demodulator of claim 1 wherein a programmable divider is adapted to match the measured count to a closest of more than two possible frequencies to discern more than a single bit value at a time.

* * * * *